United States Patent [19]
Watanabe

[11] Patent Number: 5,846,668
[45] Date of Patent: Dec. 8, 1998

[54] FUEL CELL, ELECTROLYTIC CELL AND PROCESS OF COOLING AND/OR DEHUMIDIFYING SAME

[75] Inventor: Masahiro Watanabe, No. 2421-8, Wadamachi, Kofu-shi, Yamanashi, Japan

[73] Assignees: Tanaka Kikinzoku Kogyo K. K.; Masahiro Watanabe, both of Japan

[21] Appl. No.: 813,172

[22] Filed: Mar. 7, 1997

[51] Int. Cl.⁶ .................................................. H01M 8/04
[52] U.S. Cl. ............................... 429/32; 429/39; 204/258
[58] Field of Search .................................. 429/32, 33, 38, 429/39; 204/256, 258

[56] References Cited

U.S. PATENT DOCUMENTS

| | | | |
|---|---|---|---|
| 5,252,410 | 10/1993 | Wilkinson et al. | 429/33 |
| 5,424,144 | 6/1995 | Woods | 429/39 X |
| 5,484,514 | 1/1996 | Katayama | 204/256 X |
| 5,514,487 | 5/1996 | Washington et al. | 429/34 X |
| 5,624,769 | 4/1997 | Li et al. | 429/32 |
| 5,686,199 | 11/1997 | Cavalca et al. | 429/39 X |

*Primary Examiner*—Stephen Kalafut
*Attorney, Agent, or Firm*—Klauber & Jackson

[57] ABSTRACT

Disclosed herein are an fuel cell and/or an electrolytic cell which comprises a plurality of unit cells, and one or more separator plates having one or more anode gas supply grooves and one or more cathode gas supply grooves inserted between two adjacent unit cells, at least part of the anode gas supply grooves and the cathode gas supply grooves being overlapped in the direction of the width of the separator plate, and a process of cooling and/or dehumidifying the fuel cell and/or the electrolytic cell by flowing a reaction gas thereto. The most preferable separator plate is such that the anode gas supply grooves and the cathode gas supply grooves are separated by a thin separator wall made of a metal or an electroconduntive resin.

18 Claims, 9 Drawing Sheets

FUEL CELL, ELECTROLYTIC CELL AND PROCESS OF COOLING AND/OR DEHUMIDIFYING SAME

BACKGROUND OF THE INVENTION

The present invention relates to a fuel cell and an electrolytic cell which may be operated at a low temperature, especially those employing an ion exchange membrane as an electrolyte, and a process of effectively cooling and/or dehumidifying the fuel cell and the electrolytic cell.

Since a fuel cell is a highly efficient and non-pollution-type electric power generation apparatus employing hydrogen and various fossil fuels, it is attracting much social attention as a "post atomic energy" apparatus which may meet with problems about energy and global pollution. Various fuel cells depending their applications such as electric power generation substituted for thermal generation, on-site electric power generation in a building and a factory, and electric power generation employed in the space have been developed. In recent years, a greenhouse effect mainly caused by carbon dioxide and acid rain caused by NOx, SOx and the like have been recognized as serious pollutions threatening our future. Since one of the main discharge resources of these pollution gases is an internal combustion engine such as an automobile engine, there has been a strong tendency that a fuel cell is utilized as an electric power source for a motor in place of the internal combustion engine of an automobile, in this case, the cell is desirably as small as possible as the other various ancillary components so that the cell itself is required to have a high output density and a high output current density. A solid polymer electrolyte fuel cell employing an ion exchange membrane (the fuel cell will hereinafter be referred to as "PEFC" and the ion exchange membrane will hereinafter be referred to as "PEM") is attracting attention as a suitable fuel cell satisfying these conditions.

The basic structure, the function and the problems of the PEMFC main body will be described. As shown in FIG. 1, a basic cell is constituted by a PEM 1. an anode 4A and a cathode 4C located on both sides of the PEM 1 bonded by means of hotpressing. The anode and the cathode are composed of porous catalyst layers 2A,2C and electroconductive porous support layers 3A,3C such as carbon paper, respectively. Electrode reactions take place on the catalyst layer surfaces of the portions 2A,2C. An anode reactant gas ($H_2$) is supplied to the portion 2A through reaction gas supplying grooves 5A and electroconductive porous support layer 3A, and a cathode reactant gas ($O_2$) is supplied to the portion 2C through reaction gas supplying grooves 5C and electroconductive porous support layer 3C.

An anode reaction ($H_2 \rightarrow 2H^+ + 2c$) takes place in the catalyst layer 2A while a cathode reaction ($\frac{1}{2}O_2 + 2H^+ + 2c^- \rightarrow H_2O$) takes place in the catalyst layer 2C. An overall reaction in the cell is $H_2 + \frac{1}{2}O_2 \rightarrow H_2O + Q$ (heat of reaction) as a result of the total of the above two reactions. An electromotive force is obtained in this step, and by means of the said electric energy, then electric work is done when an electron flows through an external load 8. Since this electromotive reaction is not reversible, its irreversible portion (this is called an overvoltage which is designated by $\eta$) exists. An internal resistance (R) exists in the cell so that a voltage loss of IR is generated when a current (I) flows. As a result, a part equal to $[(\eta I + I^2 R) + \text{(heat of reaction)}]$ is accumulated, as a heat in the cell which produces no electric power. Accordingly, especially in the case of PEFC which is required to work at a high current density, the cooling of the cell is a primarily important subject.

In the electromotive reaction, 2H' produced on the anode migrate in PEM to the cathode while one H' carries 2 to 2.5 $H_2O$ molecules on the average so that one $H_2$ molecule carries 4 to 5 water molecules which migrate from the anode to the cathode. PEM has a property of realizing sufficient $H^+$ conductivety only when a reqired amount of moisture is present in the mebrane so that the moisture deffcient in the membrane due to the migration of the water molecules accompanied by $H^+$ must be continueously and externally (at least the anode side) supplemented. A total amount of the moisture migrating in the membrane toward the cathde and of the moisture produced by the cathodic reaction is so large that the supply of the reaction gas ($O_2$) through the catalyst layer 2C to the surface of the catalyst supported on it is remarkably prevented to lower the cell characteristics if the above moisture condenses in the fine pores of the catalyst layer 2C and of the gas supplying groove 3C. Accordingly, the removal of the moisture to the outside of the cell without producing the condensation is a second important subject.

Gas separator plates (designated as 6A and 6C in FIGS. 1 and 2) are generally required to have functions of uniformly and separately supplying a fuel gas and an oxidant gas to the respective electrode rear portions and of effectively collecting electricity produced by the reaction. Further, the heat of reaction is required to be radiated through the gas separators in order to stabilize the operation conditions because the heat generation during the cell reaction is large.

Therefore, a conventional structure such as a multiplicity cell which is composed of a plurality of gas separators having gas supply grooves on both surfaces and a plurality of PEM-cathode-anode composites (unit cells) alternately piled, that is accompanied with a cooling jacket around the cell or accompanied with cooling plates inserted between every several cells have been adopted. In the recent years, as shown in FIG. 2, another jacket-like cooling structure in which cooling water can be passed in the rears of the cathode and the anode of every cell is proposed. In the former, however, it is difficult to uniformly cool the respective cells or the periphery and the interior of the respective cells. The latter has the serious drawback in removing the excess moisture produced in the cathode though the cooling can be compleltely performed, that is, the fine pores of the cathode 4C is nearly saturated with water vapor in PEFC, and if the cooling jacket having a temperature below the working temperature (dew point) is contacted thereto, the moisture condenses as liquid water around the jacket. Consequently, the supply of the reaction gas and the removal of the produced moisture are depressed to disable the cell operation at a high current density. Accordingly, it is essential to propose a new cell structure including a gas separator structure and its operation which enable both of the cooling and the dehumidification.

In the conventional cell structure as shown in FIG. 2, component 6 is a spacer and the anode, the cathode and the cooling jacket are piled in the direction of their thickness, that prevents the miniaturization of the cell. This is a third important subject. A new cell structure as PEFC loaded on an automobile for realizing the miniaturization is demanded.

In another conventional fuel cell structure shown in FIG. 4 of U.S. Pat. No. 5,252,410, a separator plate is employed for separating two adjacent unit cells. Although this separator plate has anode gas supply grooves and cathode gas supply grooves on the respective opposite surfaces, the two grooves are positioned in the direction of the thickness of the separator plate so that the thickness of the separator plate is inevitably larger than the total depth of the two grooves to prevent the miniaturization of the fuel cell. Zigzag grooves are shown in FIGS. 11 to 14 of the above patent, but they are formed on the surfaces of the electrodes.

The above subjects have been described in connection with the fuel cell. On the other hand, as well known in an electrolytic cell employing an ion exchange membrane, water electrolysis which is an entirely reverse reaction to that of the fuel cell can be performed employing the same strucure as that or the fuel cell. Similar subjects and disadvantages regarding the electrolytic cell as well as the other electro-synthetic cells can be pointed out by replacing "anode" and "cathode" of the above description regarding the fuel cell with "cathode" and "anode", respectively. Similar disadvantages also exist in electrolysis other than the water electrolysis.

SUMMARY OF THE INVENTION

In view of the above drawbacks, an object of the present invention is to provide a fuel cell and/or an electrolytic cell in which effective cooling and/or dehumidification can be attained.

Another object of the present invention is to provide the fuel cell and/or the electrolytic cell which may be miniaturized.

A further object of the present invention is to provide a process of cooling and/or dehumidifying the fuel cell and/or the electrolytic cell.

The present invention is a fuel cell and/or an electrolytic cell which comprises a plurality of unit cells, and one or more separator plates having one or more anode gas supply grooves and one or more cathode gas supply grooves inserted between two adjacent unit cells, and at least part of the anode gas supply grooves and the cathode gas supply grooves is overlapped in the direction of the width of the separator plate.

The anode gas supply groove of the fuel cell may be one zigzag continuous groove, and the cathode gas supply groove may be discontinuous grooves separated by the anode gas supply groove. A manifold can be employed for supplying an anode gas and/or a cathode gas. The manifold may be an external one equipped on the edge of the electrodes, or an internal one passing through the separate plates.

In the electrolytic cell, "anode" and "cathode" of the above fuel cell are replaced with "cathode" and "anode", respectively.

The present invention also includes a process of cooling and/or dehumidifying a fuel cell and/or an electrolytic cell by flowing a reaction gas to the fuel cell and/or the electrolytic cell having the above structures.

Since, in accordance with the present invention, at least part of the anode gas supply grooves and the cathode gas supply grooves are overlapped in the direction of the width of the separator plate, the thickness of the separator plate can be reduced so that the overall structure of the fuel cell and the electrolytic cell can be miniaturized, which is most appropriate as a fuel cell loaded on an automobile.

When a metal thin plate or an electroconductive resin thin plate which is heat-conductive is employed as a separator wall for separating the above two grooves, the smooth removal of the moisture can be achieved.

DETAILED DESCRIPTION OF THE INVENTION

Figure 1:
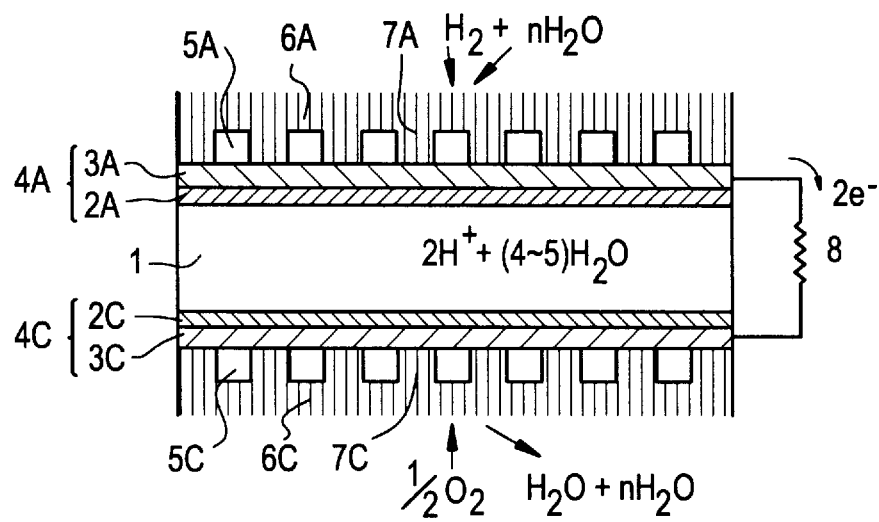
FIG. 1 is a schematic principal view showing a conventional solid polymer electrolyte fuel cell.

For both of the fuel cell and the electrolytic cell, the miniaturization is one of the most important subjects. In the present invention, this miniaturization can be effectively realized. As shown in FIG. 4 of the above U.S. Pat. No. 5,252,410, the total thickness of a conventional separator plate is the sum of the depths of the anode gas supply groove and of the cathode gas supply groove and the distance between the bottoms of the two grooves. On the other hand, in the present invention, the total thickness of the separator plate reduced by the overlapped depth and the distance between the bottoms of the two grooves. This difference is quite remarkable when the fuel cell and/or the electrolytic cell are constructed employing a plurality of the separator plates.

In the present invention, the anode gas supply groove and the cathode gas supply groove can be formed and separated from each other by means of a separator wall made of a metal thin plate or an electroconductive resin thin plate which is preferably heat-conductive. In this embodiment, the above two kinds of the grooves are present on the substantially same plane so that the above miniaturization can be most effectively attained.

Further, in this embodiment, the suitable cooling can be achieved. As mentioned earlier in connection with the prior art, when the fuel cell is cooled by contacting the cell with a cooling plane having a temperature below a dew point. The condensation of moisture almost always occurs at and around a cathode.

In the above embodiment, in order to avert this problem, a reaction gas (oxygen or air) further possesses a role as a cooling medium (gas) without the employment of a cooling jacket. In a fuel cell, the overvoltage of a cathode is larger than that of an anode so that the heat generation at the cathode is also larger. Since an anode supply gas can cool a cathode supply gas through the above thin and heat-conductive separator wall, the effective cooling of the cathode can be accomplished.

The separator plate of this embodiment is the metal thin plate or the electroconductive resin thin plate. The metal thin plate can be molded by drawing to simultaneously and simply form the anode and cathode gas supply grooves. The resin thin plate may be formed by injection-molding or scrapping-off a composite of a metal or carbon and resin.

Especially, in case of the fuel cell, the effective cooling is required. In addition to the above cooling by the anode gas, one or two manifolds for supplying the above reaction gas (both of or one of cathode gas and anode gas) can be employed to further cool the cathode at which the heat generation occurs most intensely. The introduction of the reaction gas (cooling gas) through the manifold enables the prompt diffusion of water vapor into the cooling gas containing no or less water vapor which is smoothly removed to the outside of the cell. Accordingly, the degree of saturation of the water vapor in the cathode fine pores is lowered and the dew point is also further lowered so that no condensation occurs even when the cooling is conducted, In the embodiment of the fuel cell employing the manifold, a supply amount of the cathode gas is preferably larger than that of the anode gas. Concretely, the cross-sectional area of the cathode gas supply groove is made to be larger than that of the anode gas supply groove, and an external manifold system is adopted in order to supply a plentiful amount of the cooling gas to the cathode gas supply grooves. Especially, in case of employing air as a cooling gas, a large amount of the cooling gas flow enables the elevation of cathode characteristics in addition to the effective cooling and dehumidification. In this case, an amount of the anode gas may be minimum.

DESCRIPTION OF PREFERRED EMBODIMENTS

Figure 2:
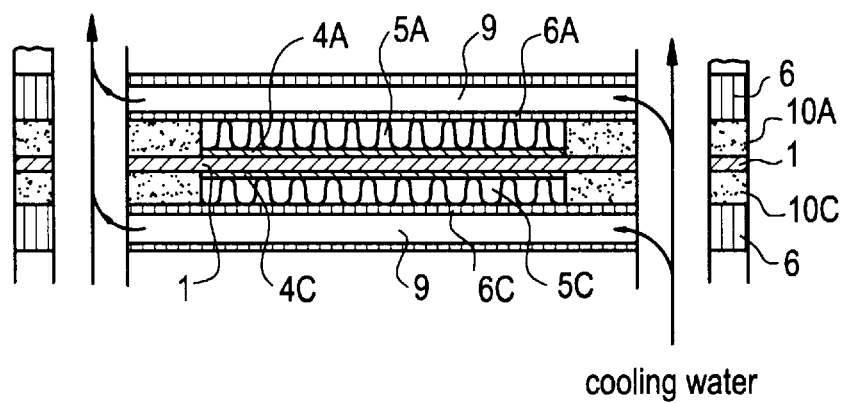
FIG. 2 is a schematic view showing a water-cooling structure of a conventional fuel cell.

Although Embodiments of the fuel cell in accordance with the present invention will be illustrated, these are not construed to restrict the invention. The components shown in FIGS. 1 and 2 may appear in FIGS. 3 to 10, and the description of these components will be omitted.

Figure 3:
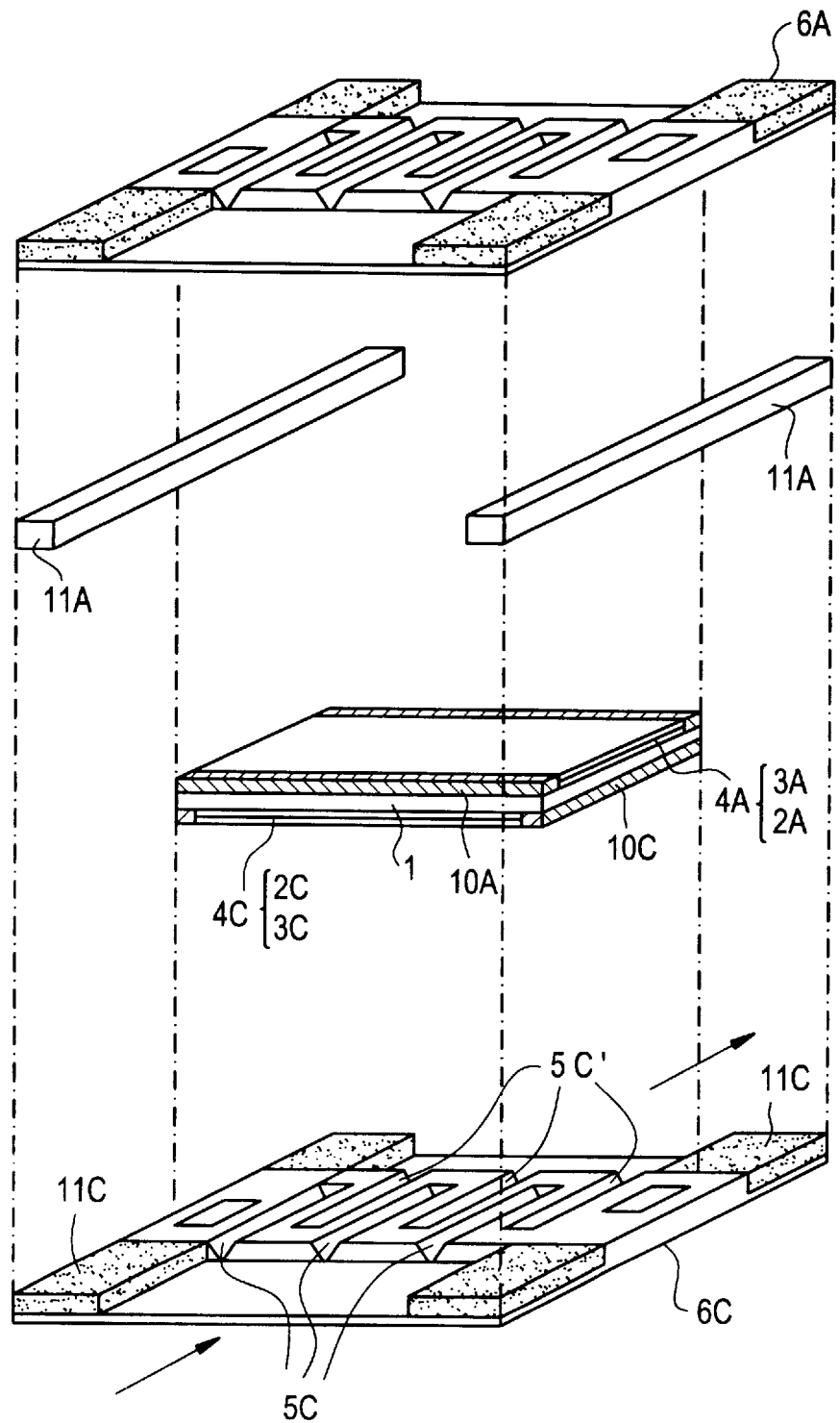
FIG. 3 is a broken perspective view of a fuel cell employing separator plates of first Embodiment.
Figure 4A:
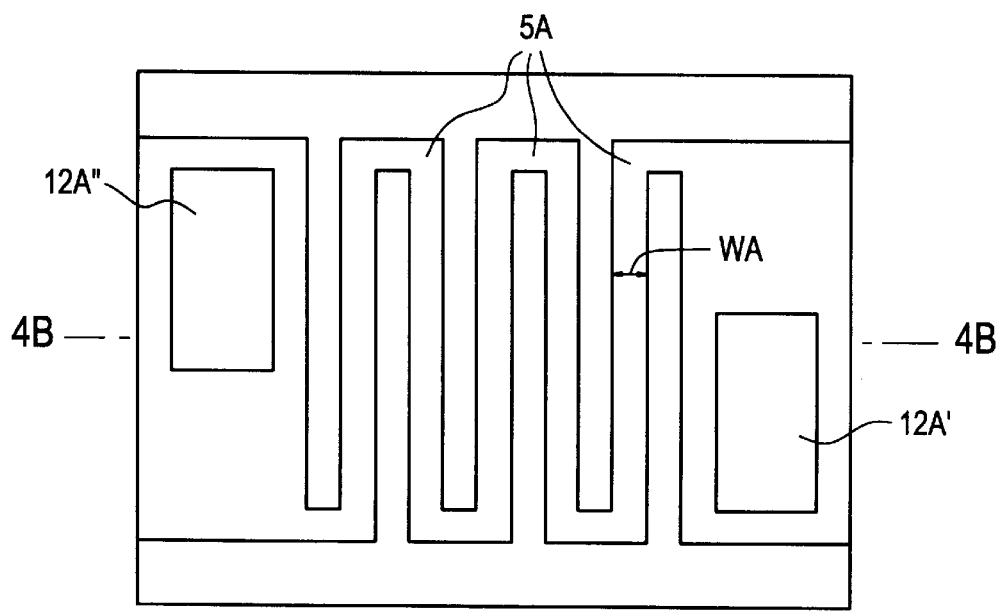
FIG. 4 is a schematic view of the separator plate of FIG. 3 [(a): anode side (bottom view), (b): A-B section, (c): cathode side (plan view)]
Figure 4B:
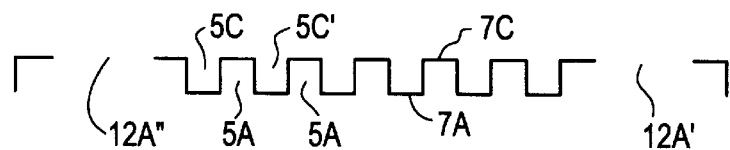
Figure 4C:
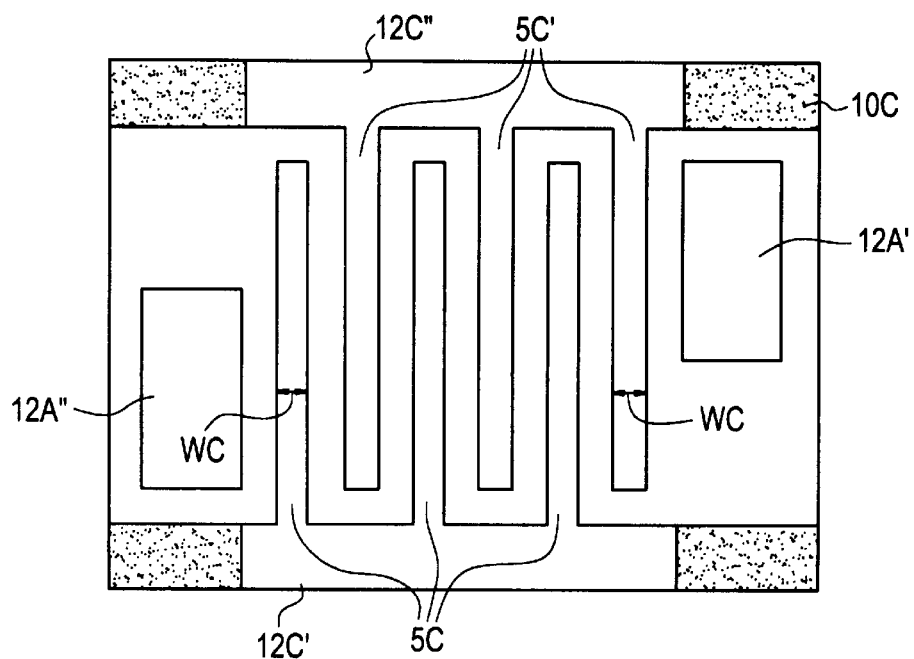
Figure 5:
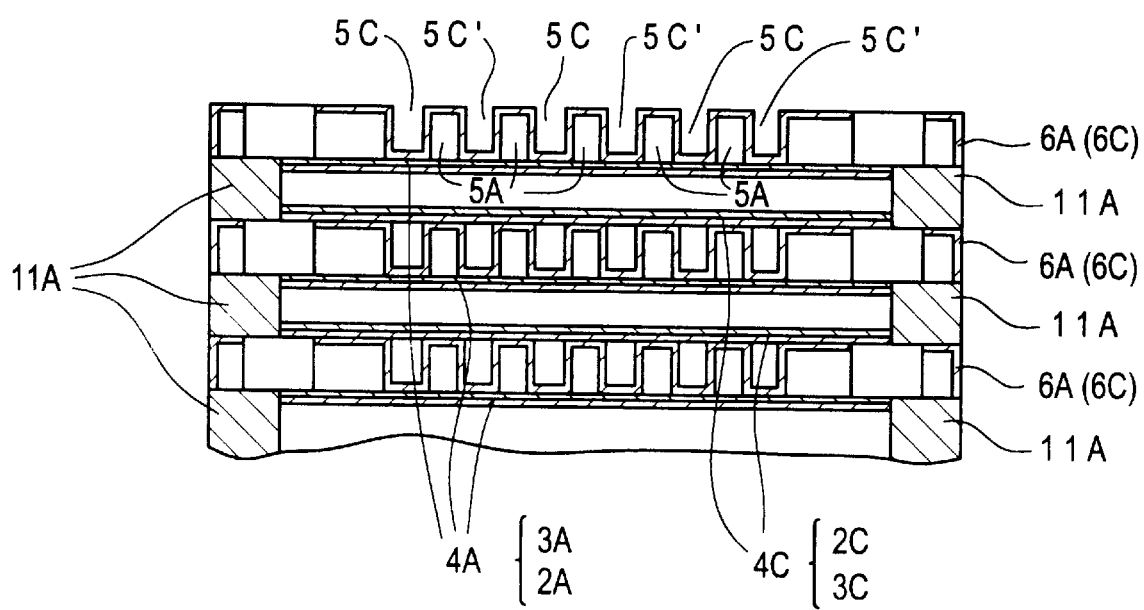
FIG. 5 is a sectional view of a plurality of unit cells and the separator plates insereted between the unit cells.

FIGS. 3 to 5 show a first Embodiment of a fuel cell of the present invention in which an anode manifold is internal and a cathode manifold is external. FIG. 3 shows a cell structure in which a separator plate is employed. Although two separator plates 6A (anode side) and 6C (cathode side) are the same, the different symbols are attached for description. The plates may be molded by drawing a copper plate having a thickness of 0.3 mm. An anode gas supply groove 5A and cathode gas supply grooves 5C, 5C' have the arrangement shown in FIGS. 4(a) and (c) and they are present alternately and parallel on the substantially same plane. This appears in FIG. 4(b) showing the cross section A-B. As shown. the cathode gas supply grooves 5C and 5C' and the anode gas supply groove 5A exist alternately from each other on the respective opposite surfaces of the separator plate, in FIG. 4, apertures 12A,12A' for an anode internal manifold are formed.

Backup rods 11A for anode side are fixed on the anode manifold edge plane of the above separator plate as shown in FIG. 3, and a gas diffusions electrode 4A is so disposed between the backup rods that its gas diffusion layer (electroconductive porous support layer) 3A faces to the separator 6A. Backup sheets 11C, perfectly made of rubber, for a cathode surface is fixed on the cathode manifold edge plane of the above separator plate as shown in FIG. 3, and a gas diffusion electrode 4C is so disposed that its gas diffusion layer (electroconductive porous support layer) 3C faces to the separator 6C. The edge of the gas diffusion electrode 4A of the cathode manifold side and the edge of the gas diffusion electrode 4C of the anode manifold side may be sealed with sealing members 10A and 10 C. A fuel cell is constituted by interposing the ion exchange membrane 1 between the reaction layer (porous catalyst layer) 2A and the reaction layer (porous catalyst layer) 2C of the gas diffusion electrode and by piling the unit cells.

The ratio between the cross sectional areas of the cathode gas supply grooves 5C, 5C' and of the anode gas supply groove 5A can be changed by changing a ratio between the groove widths (WC/WA). Since a theoretical amount of gas utilization is ½ for pure $O_2/H_2$, it is unnecessary to make WC/WA>0.5 on the viewpoint of stoichiometry. However, the cross sectional area of the cathode gas supply groove is desirably larger for the viewpoint of the cooling and the dehumidification. On the other hand, the lowering of the current collecting ability due to the minuteness of a current collecting portion 7C of the cathode and the increase of the prevention of the gas supplying ability due to the sheltering of a current collecting portion 7A of the anode must be considered. Accordingly, it is preferable to make the ratio between the cross sectional areas of the cathode gas supply groove and of the anode supply groove to be about 1 in case of employing pure oxygen as a cathode gas and to be about 3 in case of employing air.

In this Embodiment as shown in FIGS. 3 and 4, the positions of the inlet and the outlet of the manifold is maintained to be out of the center. This intends to reduce an amount of the reaction gas remaining in the manifold.

Figure 6:
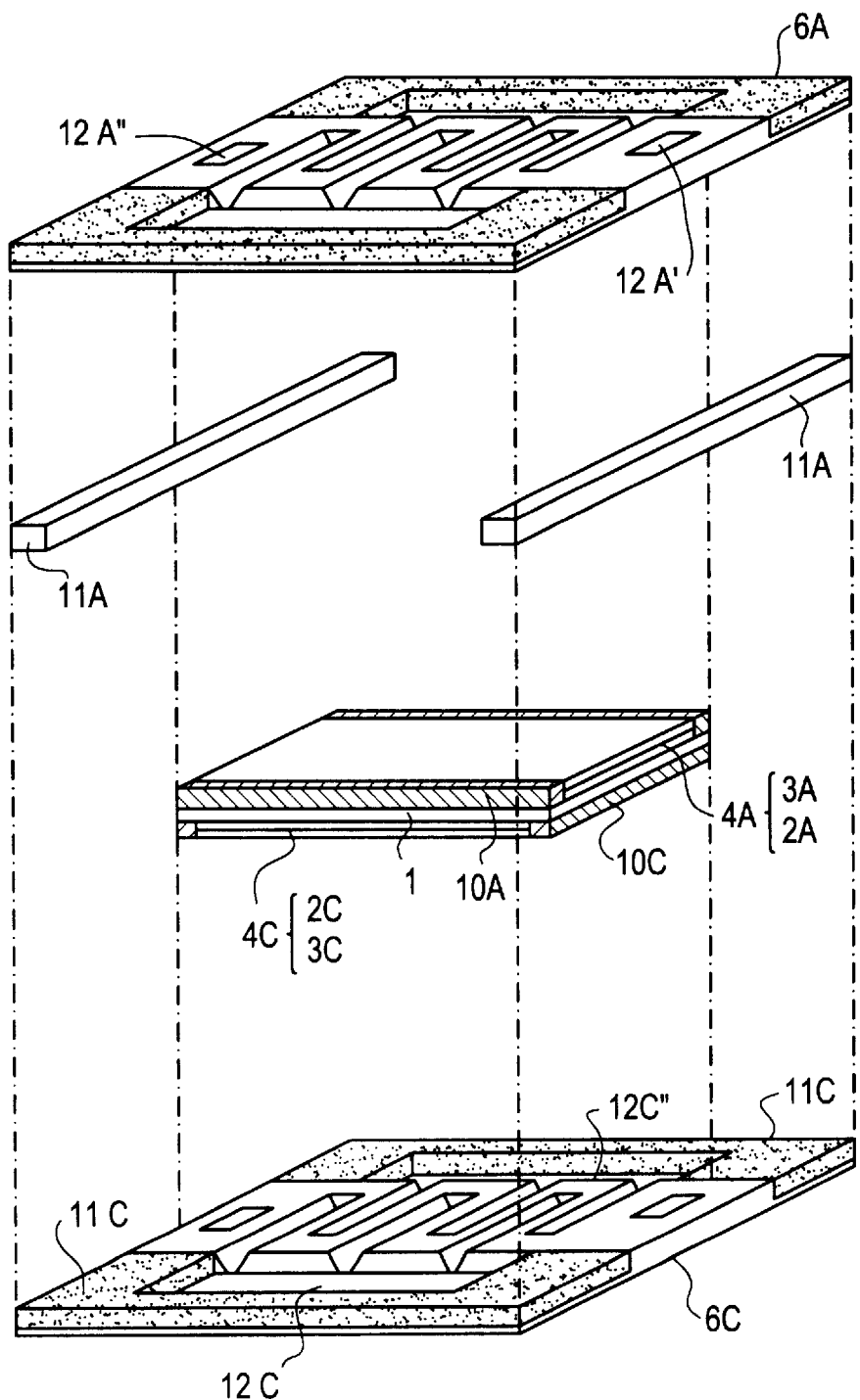
FIG. 6 is a broken perspective view of another fuel cell employing separator plates of second Embodiment.
Figure 7A:
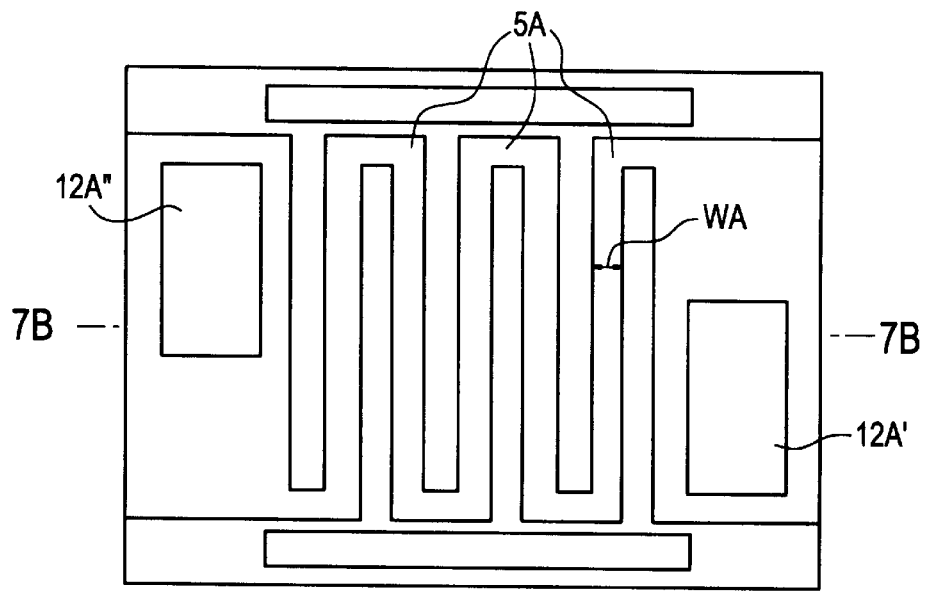
FIG. 7 is a schematic view of the separator plate of FIG. 6 [(a): anode side (bottom view), (b): A-B section, (c): cathode side (plan view)]
Figure 7B:
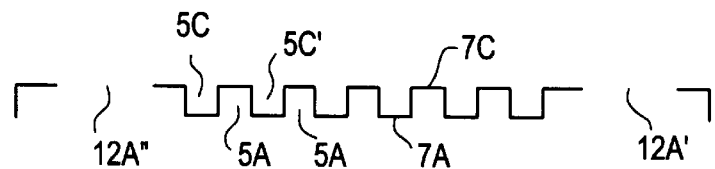

FIGS. 6 and 7 show a second Embodiment of the present invention.

For conducting the sufficient gas supply to the cathode gas supply groove, as shown in FIG. 6, the dimensions of a cathode gas supply manifold 12C' and a cathode gas discharge manifold 12C" are made to be stoichimetrically larger than those of an anode gas supply manifold 12A' and an anode gas discharge manifold 12A", and the ratio is preferably 1 to 3 times. Although the manifold 12C' and 12C" is internal, it functions similar to an external manifold because the inlet and outlet openings arc large.

Figure 8:
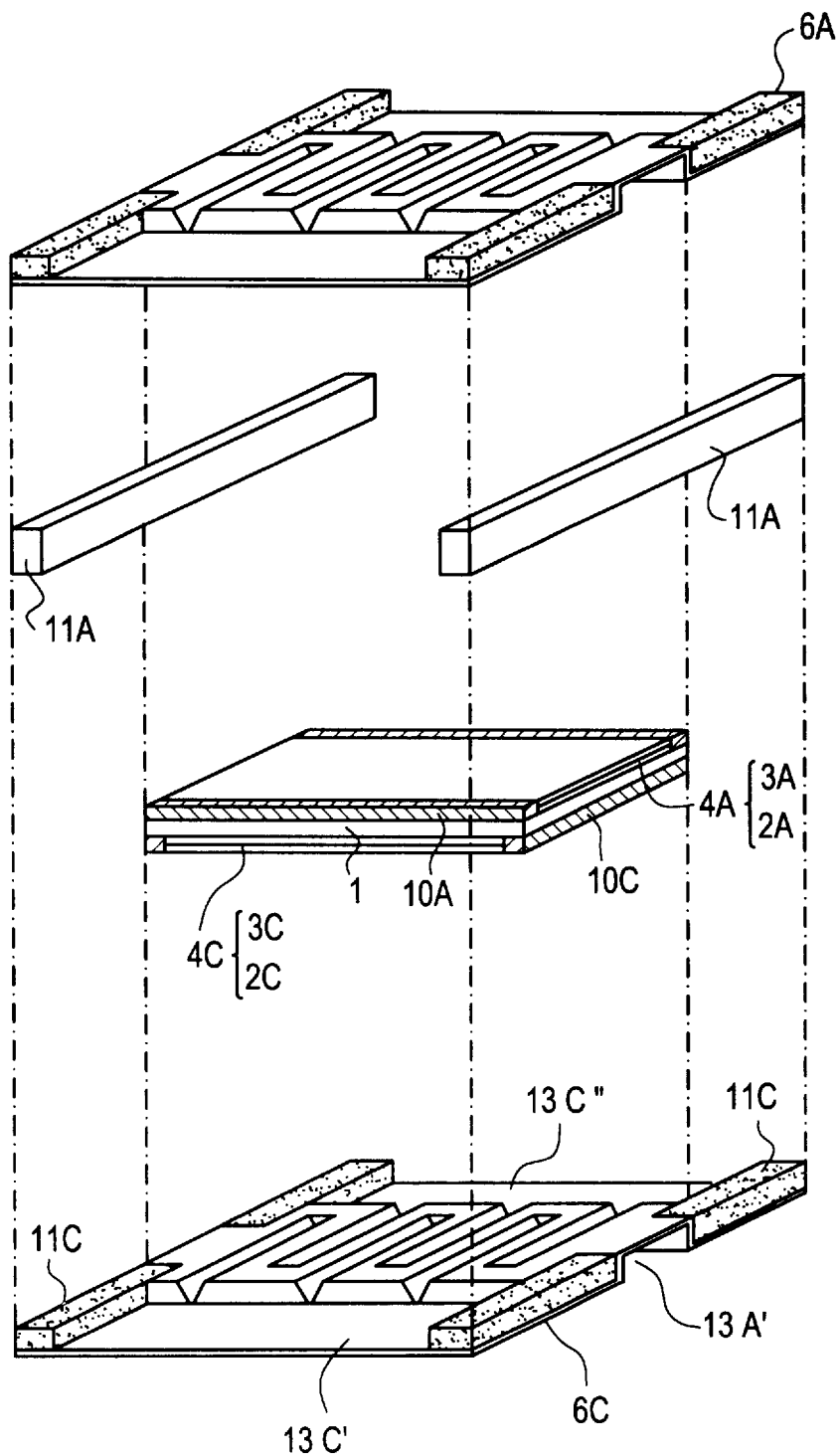
FIG. 8 is a broken perspective view of a further fuel cell employing separator plates of third Embodiment.
Figure 9A:
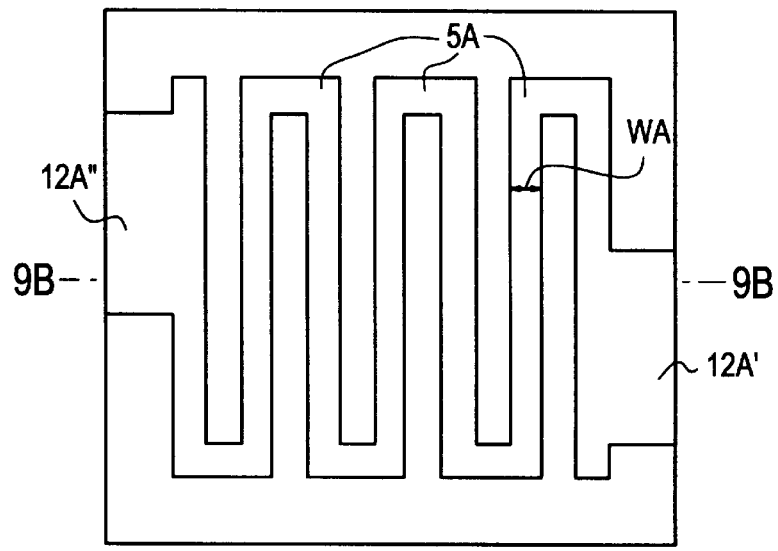
FIG. 9 is a schematic view of the separator plate of FIG. 8 [(a): anode side (bottom view), (b): A-B section, (c): cathode side (plan view)]
Figure 9B:
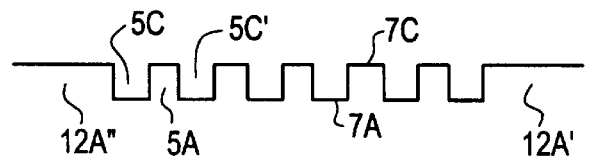

FIGS. 8 and 9 show a third Embodiment of the present invention.

In this Embodiment, an external cathode manifold 13C', 13C" and an external anode manifold 12A' are equipped for effecting a large amount of gas supply.

By supplying the reaction gas from the gas supply manifold of the fuel cell mentioned above, the gas is introduced through the gas supply grooves to the outlet of the manifold and discharged. Since the sectional area of the flowing path of the gas is large, a large amount of the cathode gas can be sufficiently provided as a cooling gas so that the cooling of the electrode and the dehuidification can be satisfactorily achieved.

Figure 7C:
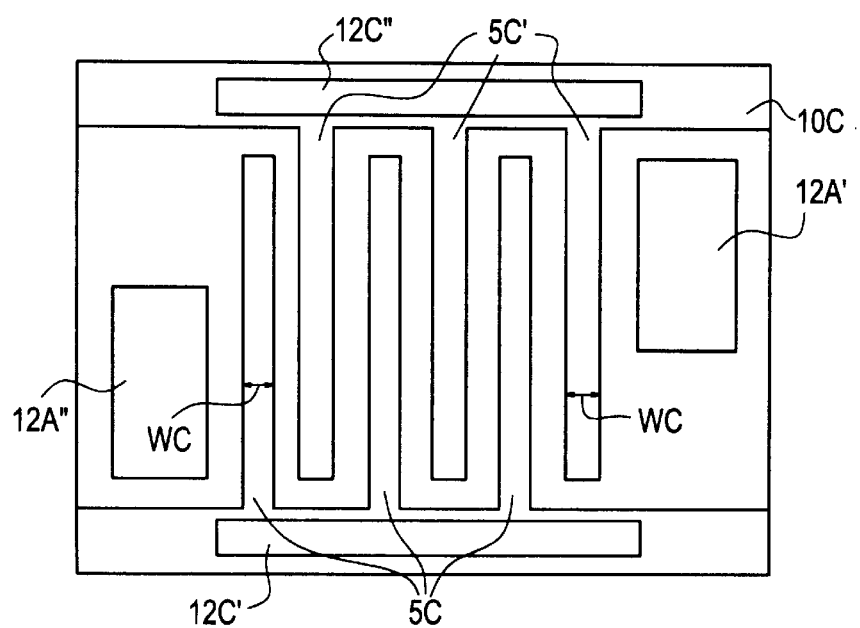
Figure 9C:
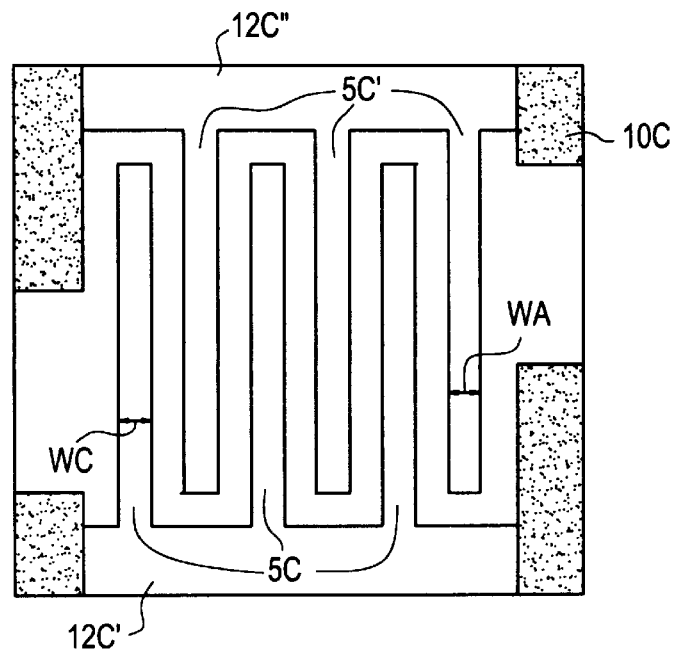

Further, as shown in FIGS. 4(c), 7(c) and 9(c), the cathode gas supply grooves (gas supply path) 5C,5C' are discontinuous so that the reaction gas passes from one cathode gas supply groove 5C to the other cathode gas supply groove 5C'. During the passing-through, the cathode gas is contact with the electroconductive porous supporting layer 3C of the gas diffusion electrode 4C which is contact with the separator plate 6C so that the cathode gas supply to the cathode of the gas diffusion electrode and the dehumidification can be effectively performed.

Figure 10:
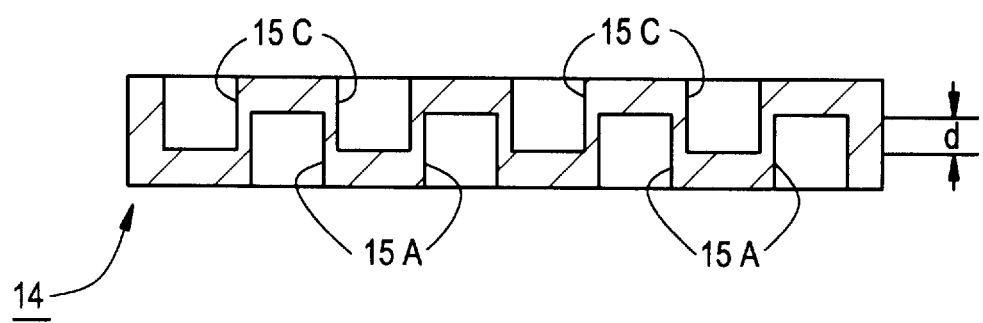
FIG. 10 is a sectional view of another example of a separator plate.

FIG. 10 show a further example of a separator plate of the present invention. This separator plate 14 has a plurality of cathode gas supply grooves 15C on the upper surface and a plurality of anode gas supply grooves 15A on the lower surface. In this separator plate, its thickness can be reduced by the distance between the bottoms of the two grooves and the overlapped length (d).

When the separator plate is made of a metal, the convex portion of one or both of the cathode gas supply groove and the anode gas supply groove are desirably surface-treated to be made corrosion-resistant. At least one of platinum, gold, palladium, rhodium, irridium and ruthenium is desirably included as a component in the surface-treating agent.

Although the section of the gas supply grooves have been described to be rectangular, the section may be other shapes such as a trapezoid.

What is claimed is:

1. A fuel cell comprising a plurality of unit cells comprising an anode; an ion exchange membrane; a cathode; at least one separator plate inserted between two adjacent unit cells, said separator plate containing at least one anode gas supply groove disposed as a zigzag continuous groove facing the anode and at least one cathode gas supply groove, at least part of the anode gas supply grooves and the cathode gas supply grooves being overlapped in the direction of the width of the separator plate; and a manifold connecting a plurality of anode gas supply grooves and cathode gas supply grooves of said plurality of unit cells, said manifold being disposed externally on the edge of the electrodes or internally passing through the separator plates.

2. The fuel cell of claim 1 wherein the anode gas supply groove and the cathode gas supply groove are located on substantially the same plane and are separated by a separator wall comprised of a metal plate or an electroconductive resin plate.

3. The fuel cell of claim 1 wherein an inlet of said manifold is connected to a first cathode gas supply groove and an outlet of said manifold is connected to a second cathode gas supply groove, said first and second cathode gas supply grooves being discontinuous grooves divided by the anode gas supply groove.

4. The fuel cell of claim 1 wherein the separator plate is comprised of a metal and a convex portion of the anode gas supply groove and/or a convex portion of the cathode gas supply groove are surface treated to thereby render such portion corrosion-resistant.

5. The fuel cell of claim 4 wherein the surface treatment is carried out by employing a surface-treating composition containing an element selected from the group consisting of platinum, gold, palladium, rhodium, iridium and ruthenium.

6. A fuel cell comprising a plurality of unit cells comprising an anode; an ion exchange membrane; a cathode; at least one separator plate inserted between two adjacent unit cells, said separator plate containing at least one anode gas supply groove disposed as a zigzag continuous groove facing the anode and at least one cathode gas supply groove, at least part of the anode gas supply grooves and the cathode gas supply grooves being overlapped in the direction of the width of the separator plate, a ratio between the cross sectional area of the cathode gas supply groove and the cross sectional area of the anode gas supply groove being 3 to 1.

7. The fuel cell of claim 6 wherein the anode gas supply groove and the cathode gas supply groove are located on substantially the same plane and are separated by a separator wall comprised of a metal plate or an electroconductive resin plate.

8. The fuel cell of claim 6 wherein the separator plate is comprised of a metal and a convex portion of the anode gas supply groove and/or a convex portion of the cathode gas supply groove are surface treated to thereby render such portion corrosion-resistant.

9. The fuel cell of claim 8 wherein the surface treatment is carried out by employing a surface-treating composition containing an element selected from the group consisting of platinum, gold, palladium, rhodium, iridium and ruthenium.

10. An electrolytic cell comprising a plurality of unit cells comprising an anode; an ion exchange membrane; a cathode; at least one separator plate inserted between two adjacent unit cells, said separator plate containing at least one anode gas supply groove disposed as a zigzag continuous groove facing the anode and at least one cathode gas supply groove, at least part of the anode gas supply grooves and the cathode gas supply grooves being overlapped in the direction of the width of the separator plate; and a manifold connecting a plurality of anode gas supply grooves and cathode gas supply grooves of said plurality of unit cells, said manifold being disposed externally on the edge of the electrodes or internally passing through the separator plates.

11. The electrolytic cell of claim 10 wherein the anode gas supply groove and the cathode gas supply groove are located on substantially the same plane and are separated by a separator wall comprised of a metal plate or an electroconductive resin plate.

12. The electrolytic cell of claim 10 wherein an inlet of said manifold is connected to a first cathode gas supply groove and an outlet of said manifold is connected to a second cathode gas supply groove, said first and second cathode gas supply grooves being discontinuous grooves divided by the anode gas supply groove.

13. The electrolytic cell of claim 10 wherein the separator plate is comprised of a metal and a convex portion of the anode gas supply groove and/or a convex portion of the cathode gas supply groove are surface treated to thereby render such portion corrosion-resistant.

14. The electrolytic cell of claim 13 wherein the surface treatment is carried out by employing a surface-treating composition containing an element selected from the group consisting of platinum, gold, palladium, rhodium, iridium and ruthenium.

15. A electrolytic cell comprising a plurality of unit cells comprising an anode; an ion exchange membrane; a cathode; at least one separator plate inserted between two adjacent unit cells, said separator plate containing at least one anode gas supply groove disposed as a zigzag continuous groove facing the anode and at least one cathode gas supply groove, at least part of the anode gas supply grooves and the cathode gas supply grooves being overlapped in the direction of the width of the separator plate, a ratio between the cross sectional area of the cathode gas supply groove and the cross sectional area of the anode gas supply groove being 3 to 1.

16. The electrolytic cell of claim 15 wherein the anode gas supply groove and the cathode gas supply groove are located on substantially the same plane and are separated by a separator wall comprised of a metal plate or an electroconductive resin plate.

17. The fuel cell of claim 15 wherein the separator plate is comprised of a metal and a convex portion of the anode gas supply groove and/or a convex portion of the cathode gas supply groove are surface treated to thereby render such portion corrosion-resistant.

18. The fuel cell of claim 17 wherein the surface treatment is carried out by employing a surface-treating composition containing an element selected from the group consisting of platinum, gold, palladium, rhodium, iridium and ruthenium.

* * * * *